United States Patent
Iimura

(10) Patent No.: US 9,881,379 B2
(45) Date of Patent: Jan. 30, 2018

(54) SELF-LOCALIZATION DEVICE AND MOVABLE BODY

(71) Applicant: Hitachi, Ltd., Chiyoda-ku, Tokyo (JP)

(72) Inventor: Taiki Iimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 140 days.

(21) Appl. No.: 15/052,166

(22) Filed: Feb. 24, 2016

(65) Prior Publication Data

US 2016/0253806 A1  Sep. 1, 2016

(30) Foreign Application Priority Data

Feb. 27, 2015  (JP) .................................. 2015-037623

(51) Int. Cl.
*G06K 9/00*  (2006.01)
*G06T 7/00*  (2017.01)
*G06T 7/73*  (2017.01)

(52) U.S. Cl.
CPC ............. *G06T 7/0044* (2013.01); *G06T 7/74* (2017.01); *G06T 2207/30244* (2013.01); *G06T 2207/30252* (2013.01)

(58) Field of Classification Search
CPC .................. G06K 9/00664; G06T 7/74; G06T 2207/30244; G06T 2207/30252; G05D 2201/0213
USPC ........................................ 382/103, 218, 220
See application file for complete search history.

(56) References Cited

U.S. PATENT DOCUMENTS

| 9,239,580 B2* | 1/2016 | Asahara ................. G05D 1/024 |
| 9,527,212 B2* | 12/2016 | Artes ................... G05D 1/0274 |
| 2007/0276541 A1 | 11/2007 | Sawasaki |
| 2015/0378015 A1* | 12/2015 | You ........................ G01S 13/06 701/469 |

FOREIGN PATENT DOCUMENTS

| JP | 2004-5593 A | 1/2004 |
| JP | 2007-249735 A | 9/2007 |
| JP | 2007-316966 A | 12/2007 |
| JP | 2008-165275 A | 7/2008 |
| WO | WO 2012/086029 A1 | 6/2012 |

OTHER PUBLICATIONS

English translation of Japanese-language Office Action issued in counterpart Japanese Application No. 2015-037623 dated Oct. 10, 2017 (4 pages).

* cited by examiner

*Primary Examiner* — Daniel Mariam
(74) *Attorney, Agent, or Firm* — Crowell & Moring LLP

(57) ABSTRACT

A self-localization device including a storage unit that associates and stores a plurality of reference images and imaging positions of the plurality of respective reference images and an operation unit that periodically estimates a self-location of a movable body based on information obtained from a sensor included in the movable body, wherein the operation unit determines, when estimation of the self-location fails, a moving distance from a latest self-location obtained from successful estimation of the self-location before the estimation fails using the information from the sensor and extracts a plurality of the reference images belonging to a range of the moving distance from the latest self-location and searches the plurality of extracted reference images for images similar to a current image captured by an imaging device included in the movable body to estimate the self-location of the movable body.

7 Claims, 5 Drawing Sheets

SELF-LOCALIZATION DEVICE AND MOVABLE BODY

BACKGROUND OF THE INVENTION

1. Field of the Invention

The present invention relates to a self-localization technology when a movable body mounted with a camera self-localizes.

2. Description of the Related Art

Various devices that estimate a self-location of a movable body based on information acquired from sensors including internal sensors such as a rotary encoder and a gyro sensor and external sensors such as a camera and a laser distance sensor mounted on the movable body such as a robot or a vehicle have been proposed. A technique to estimate a relative self-location from a reference point by adding up moving amounts of a movable body acquired by an internal sensor such as a rotary encoder or a gyro sensor is called dead reckoning and is superior in real-time properties due to its low-load calculation processing, but a position error accumulates in accordance with the moving amount. On the other hand, a technique to estimate a self-location based on, after detecting features of a surrounding traveling environment as a landmark of the self-location using an external sensor such as a camera or a laser range finder, absolute positions of the features grasped by map matching is known and precision of position is thereby improved, but the calculation processing thereof is high-loaded. Therefore, the technique to use dead reckoning and the technique to use map matching are each a tradeoff between precision and processing loads and to realize high-precision self-localization at low processing load, various devices using dead reckoning and map matching complexly in a time sequence and further using satellite positioning including GPS (Global Positioning System) outdoors have been proposed.

For example, according to JP-2008-165275-A, a map of landmarks whose positions do not change is prepared and landmark candidates are detected by an external sensor such as a camera or a laser distance sensor. Because matching a landmark candidate to the map each time is a high processing load, the landmark candidate matched to the map last time and the current landmark candidate are associated to reduce the number of times of directly matching the current landmark candidate to the map.

For example, according to JP-2004-5593-A, environment information for self-localization is acquired and the acquired environment information is matched to environment information contained in map information to correct self-localization values based on matching results. For matching of the environment information to the environment information contained in map information, matching to the map is performed within a predetermined range that is present based on self-localization values and if correction information of the self-location is not obtained in the matching, matching to the map is performed again by increasing the predetermined range to avoid losing the self-location.

SUMMARY OF THE INVENTION

Techniques to estimate the self-location include, as described above, the dead reckoning using an internal sensor, a technique using map matching based on an external sensor, and satellite positioning such as GPS. Further, like JP-2008-165275-A, self-localization can be performed with precision at low processing load by using these self-localization techniques complexly in a time sequence.

However, techniques using dead reckoning or map matching and satellite positioning do riot guarantee accuracy of self-localization and thus, even if these techniques are used complexly, the accuracy if self-localization is not improved. Therefore, the loss of self-location due to an increased error of the estimated self-location occurs frequently. That is, in a conventional device using dead reckoning and map matching complexly in a time sequence as typically described in JP-2008-165275-A, an estimation error of the self-location in the past is reflected in a current self-localization result and thus, with an increasing moving amount, the accuracy of map matching decreases and the self-location may sooner or later be lost. Satellite positioning such as GPS can be used outdoors, but depending on the weather or the time zone, the precision is degraded or a positioning signal cannot be received and thus, the position cannot be determined, which makes satellite positioning unsuitable as an alternative when the self-location is lost.

in contrast, according to JP-2004-5593-A, the scan range of a map is gradually increased until map matching is successful to avoid the loss of self-location. However, with an increasing scan range of the map for map matching, matching objects of the map increase and thus, unless the matching object is an explicit marker, the accuracy of map matching does not improve and therefore, the accuracy of self-localization does not improve.

As described above, improving the accuracy of self-localization without depending on satellite positioning whose precision easily changes depending on the weather or the time zone in any traveling environment where there is no explicit marker is present has become a challenge.

An object of the present invention is to provide a self-localization device or the like capable of improving the accuracy of self-localization in a movable body mounted with a camera by recovering from a state in which the self-location is lost while inhibiting an increase of processing loads.

To achieve the above object, one of a representative self-localization device of the present invention includes: a storage unit that associates and stores a plurality of reference images and imaging positions of the plurality of respective reference images; and an operation unit that periodically estimates a self-location of a movable body based on information obtained from a sensor included in the movable body, and the operation unit determines, when estimation of the self-location fails, a moving distance from a latest self-location obtained from successful estimation of the self-location before the estimation fails using the information from the sensor and extracts a plurality of the reference images belonging to a range of the moving distance from the latest self-location and searches the plurality of extracted reference images for images similar to a current image captured by an imaging device included in the movable body to estimate the self-location of the movable body.

According to the self-localization device or the like in the above mode, the accuracy of self-localization can be improved by recovering from a state in which the self-location is lost while inhibiting an increase of processing loads.

DESCRIPTION OF THE PREFERRED EMBODIMENT

Hereinafter, an example will be described using the drawings.

EXAMPLE 1

In the present example, a movable body such as a vehicle or a robot that self-localizes is mounted with a camera and when the self-location is lost, recovers from a state in which the self-location is lost by a self-localization device according to the present invention.

Figure 1:
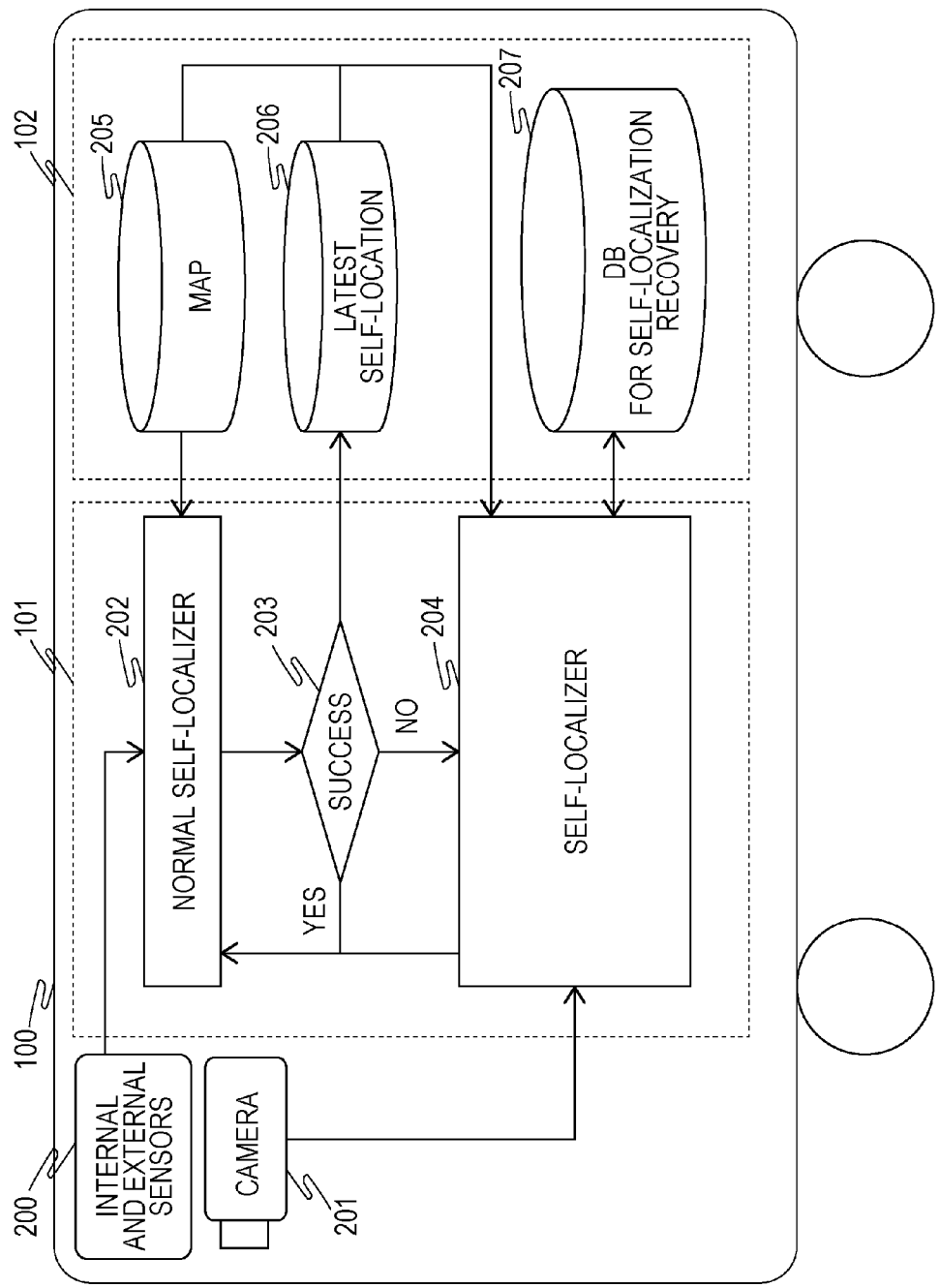
FIG. 1 is a block diagram showing the configuration of a movable body according to Example 1.

FIG. 1 shows the configuration of a movable body 100 according to the present example and the movable body 100 is mounted with an internal and external sensor 200 and a camera 201 used by a self-localization device according to the present invention and further, a CPU 101 and a storage device 102. In FIG. 1, a normal self-localizer 202 and a self-localizer 204 as programs executed by the CPU 101 are shown as a function block diagram.

The internal and external sensor 200 is a sensor needed for a self-localization technique performed by the normal self-localizer 202 described below such as a rotary encoder, a gyro sensor, and an inertial measurement unit (IMU) to perform dead reckoning, a laser distance sensor, a camera, and a laser radar to perform map matching, and a GPS sensor for satellite positioning. When the normal self-localizer 202 described below performs processing using a camera image, the camera 201 used in the present invention may also be used as the internal and external sensor 200.

To image the traveling environment widely, it is desirable to mount a plurality of standard cameras or a wide-angle camera or a super-wide-angle camera as the camera 201. Further, when traveling a dark place like in the night, it is desirable to mount an infrared camera. When a plurality of standard cameras is mounted, it is desirable to mount the cameras in positions from which the surroundings of the movable body can be imaged equally. When a wide-angle camera or a super-wide-angle camera is mounted, it is desirable to mount the camera upward at the top of the movable body. Further, it is desirable to fix the camera so that the camera posture does not move while mounted, but when a system that always grasps the camera posture is mounted, the camera posture may not be fixed. Further, images captured by the camera 201 may be color images or gray-scale images. Based on information acquired by the internal and external sensor 200, the normal self-localizer 202 estimates the self-location. If the internal and external sensor 200 is a rotary encoder, a gyro sensor, or an inertial measurement unit, the self-location is estimated by dead reckoning. If the internal and external sensor 200 is a laser distance sensor, a camera, or a laser radar, the self-location is estimated by using map matching that matches feature information of the traveling environment detected by the internal and external sensor 200 to a map 205. To improve the precision of self-location estimated by the normal self-localizer 202 and reduce processing loads, it is desirable to mount various kinds of the internal and external sensors 200 and to complexly use the dead reckoning and map matching and further in the outdoor case, satellite positioning such as GPS in a time sequence. For example, the extended Kalman filter and the particle filter are known as techniques to complexly use results of the technique of the dead reckoning or map matching and satellite positioning, but any other technique may also be used.

In a conditional branch 203, if the self-localization is successful in the normal self-localizer 202, the storage device 102 is caused to store the self-location estimated by the normal self-localizer 202 as a latest self-location 206 before proceeding to the normal self-localizer 202. If the self-localization fails in the normal self-localizer 202, the processing proceeds to the self-localizer 204 in the present invention.

When the normal self-localizer 202 fails in self-localization and loses the self-location, the self-localizer 204 estimates the self-location based on a DB for self-localization recovery 207, the map 205, and the latest self-location 206 obtained by successful self-localization by the normal self-localizer 202 and returns the result to the normal self-localizer 202. Details of the processing by the self-localizer 204 will be described below.

The map 205 contains images (reference images) of the traveling environment captured in the past and information about imaging positions and postures of the reference images. The camera used to capture the reference images is desirably a standard camera if the camera 201 mounted on the movable body 100 is a standard camera, a wide-angle camera it the camera 201 is a wide-angle camera, and a super-wide-angle camera if the camera 201 is a super-wide-angle camera. In addition, there may be a difference of resolution between the camera 201 and the camera used to capture reference images of the map 205. That is, a plurality of reference images and imaging positions of respective reference images are associated and stored in the map 205 and the self-location of the movable body can be estimated by matching images captured by the camera to reference images to search for similar images.

Figure 2:
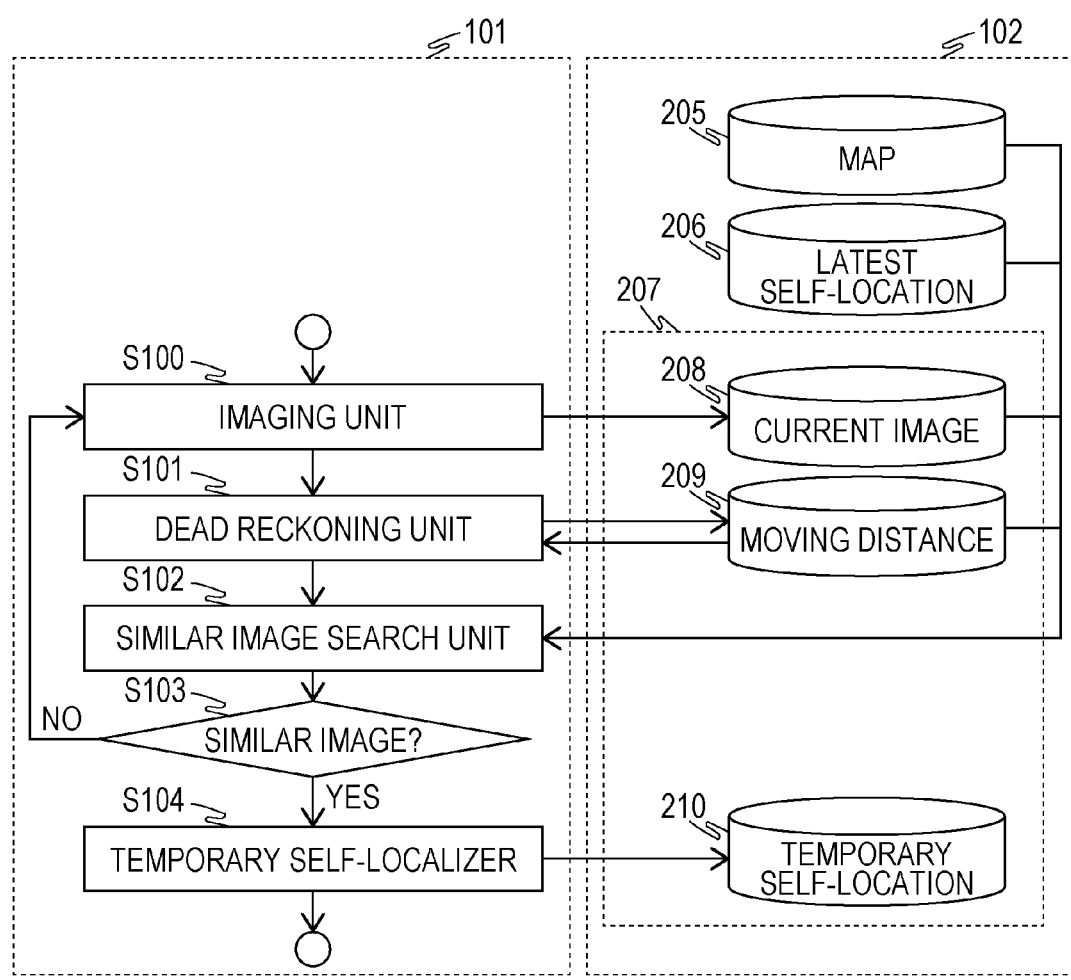
FIG. 2 is a flow chart of a self-localization device according to Example 1.
Figure 3:
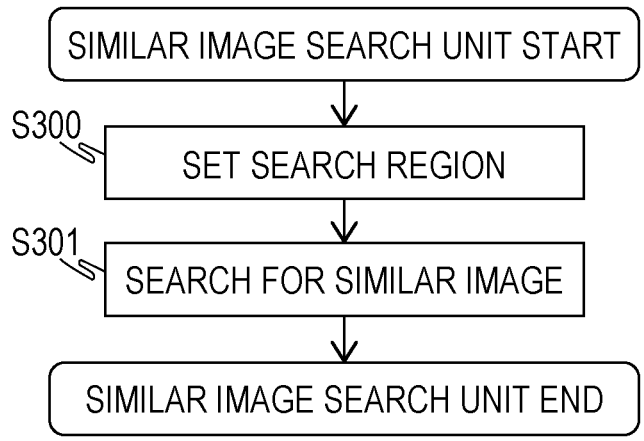
FIG. 3 is a flow chart of a similar image search unit according to Example 1.
Figure 4:
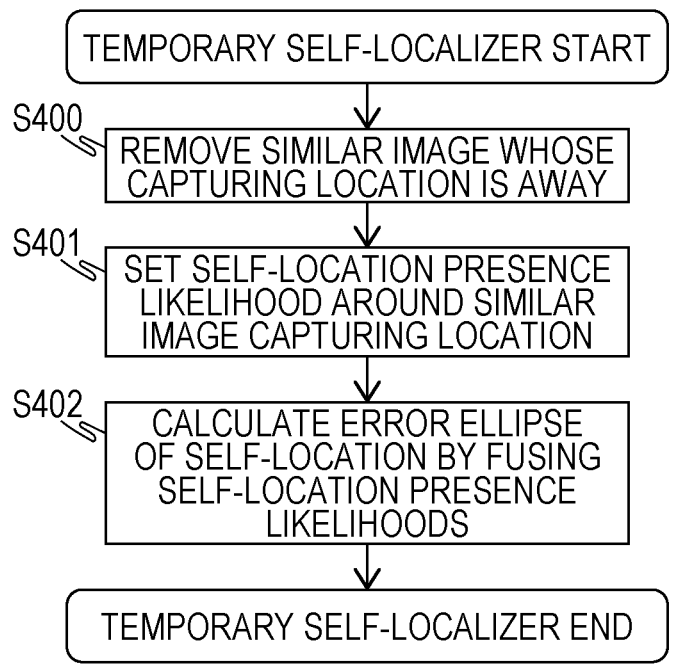
FIG. 4 is a flow chart of a temporary self-localizer according to Example 1.

FIG. 2 shows a flow chart of the self-localizer 204 in FIG. 1. FIG. 3 shows details of a similar image search unit S102 in FIG. 2. FIG. 4 shows details of a temporary self-localizer S104 in FIG. 2. FIGS. 5, 6, 7, 8, and 9 show processing content of the self-localizer 204 in the present invention.

When it becomes impossible to update the latest self-location 206 (D100 in FIG. 5) by the normal self-localizer 202 and the self-location is lost (D101 in FIG. 5), an imaging unit S100 images the traveling environment by the camera 201 mounted on the movable body 100 and causes the storage device 102 to store the captured image as a current image 208.

A dead reckoning unit S101 calculates the moving amount (D103 in FIG. 5) of the movable body 100 from the latest self-location 206 (D100 in FIG. 5) and causes the storage device 102 to store a moving distance 209. For the dead reckoning, wheel odometry using a rotary encoder that acquires the number of rotations of the wheel of the movable body 100, an inertial navigation system (INS) using a gyro sensor or an inertial measurement unit that acquires moving acceleration or angular acceleration of the movable body 100, and further visual odometry that calculates the moving amount of the movable body 100 from changes of images obtained by continuously imaging the traveling environment by the camera are known and these techniques may complexly be used or any one of these techniques may be used alone. When the wheel odometry is used, the moving amount can immediately be calculated from the number of rotations of the wheel, which makes this technique low-load processing and suitable for real-time processing, but if the road is not paved or the road surface undulates, this technique is susceptible to slips of the wheel and changes of the wheel diameter and therefore, the precision thereof is low. When the inertial navigation system is used, the system is less susceptible to the pavement state of the road and other environmental disturbances and is more precise than the wheel odometry, but if the movable body 100 is mounted with a suspension and the movable body sways on a hill or the like, angular acceleration of posture in three directions of the movable body 100 changes, which degrades the precision. In addition, the inertial navigation system is higher-loaded than the wheel odometry. When the visual odometry is used, this technique is less susceptible to the pavement state of the road, but in an environment of a wide field of view, it is necessary to detect as many features as possible by directing the camera toward the road surface. Moving amounts are added up in all techniques and thus, the moving distance 209 when a self-localization device according to the present invention is started is zero and the moving distance 209 continues to be added up until the self-localization device according to the present invention is terminated. Further, each technique is a technique that calculates a relative translational moving amount and a rotation amount from a reference point and with an increasing translational moving amount, the relative position from the reference point is more susceptible to an error of the rotation amount and therefore, an error of the direction of movement from the reference point calculated by dead reckoning tends to be larger than that of the moving distance.

Based on the moving distance 209 of the movable body 100 calculated by the dead reckoning unit S101, the similar image search unit S102 searches for a similar image of the current image 208 from the map 205 stored in the storage device of the movable body 100.

Figure 5:
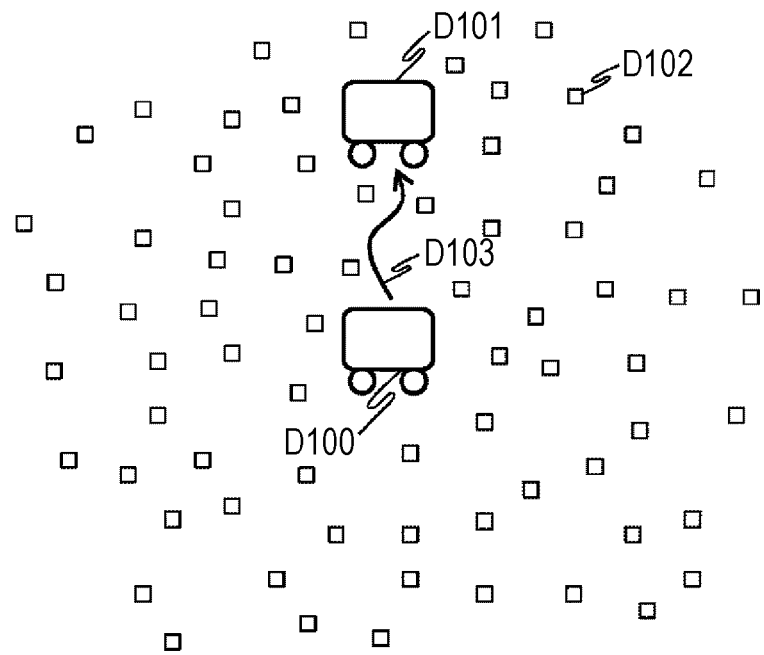
FIG. 5 is a diagram showing content of the self-localization device according to Example 1.
Figure 6:
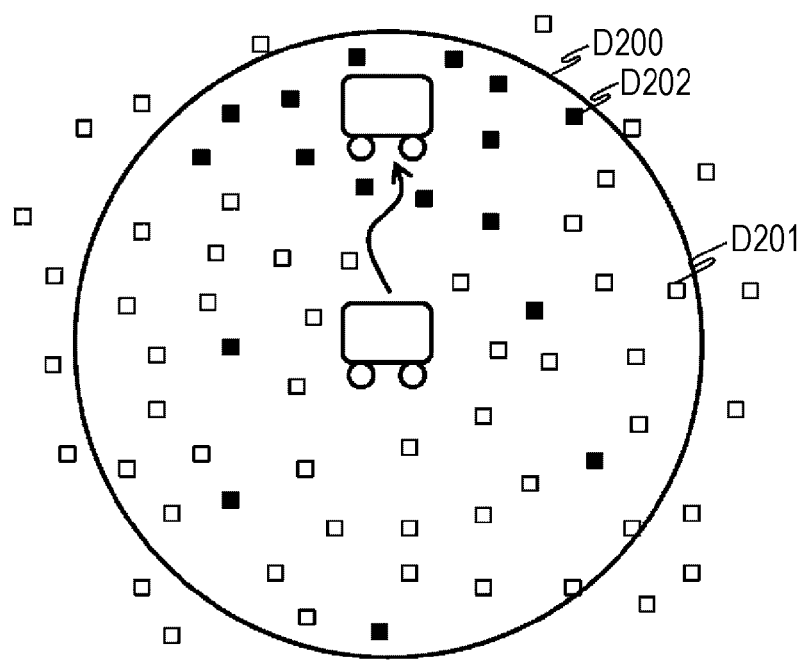
FIG. 6 is a diagram showing content of the self-localization device according to Example 1.
Figure 7:
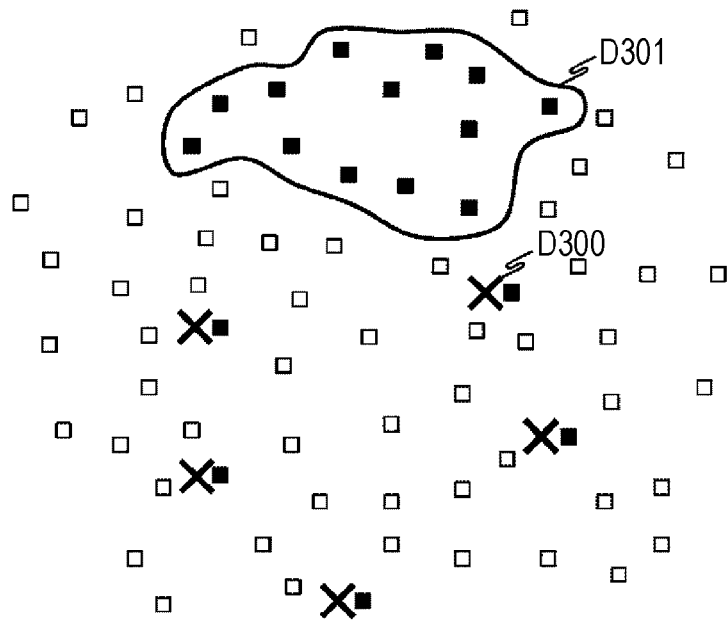
FIG. 7 is a diagram showing content of the self-localization device according to Example 1.
Figure 8:
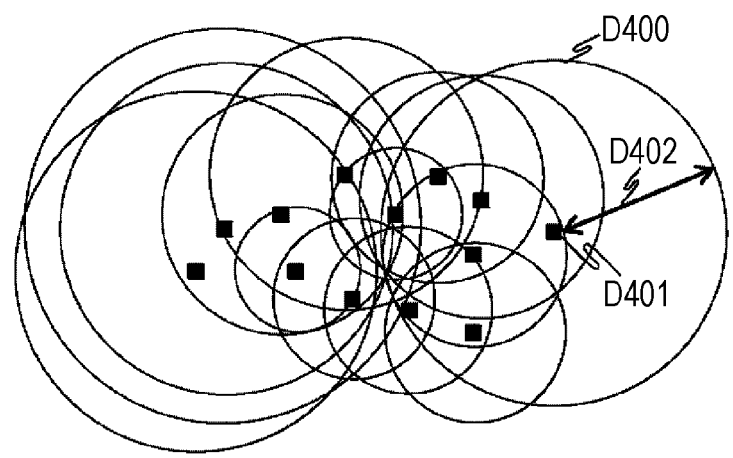
FIG. 8 is a diagram showing content of the self-localization device according to Example 1.
Figure 9:
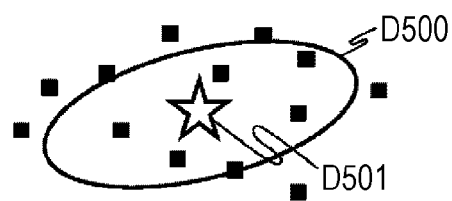
FIG. 9 is a diagram showing content of the self-localization device according to Example 1.

First, in S300 of FIG. 3, a region (D200 in FIG. 6) in which a similar image of the current image 208 is searched for is set from the map 205 (D102 in FIG. 5). The search region D200 of a similar image is assumed to be a region around the latest self-location 206 (D100) whose radius is double the moving distance 209. The reason for not using information of the direction of movement among moving amounts of calculated by the dead reckoning unit S101 to set the search region D200 is that, as described above Next, in S301 of FIG. 3, among reference images D102 stored in the map 205 (D102) and whose imaging position is known, the reference images D102 contained in the search region D200 are set search target images (D201 in FIG. 6) and the search target images D201 are searched for a similar image (D202 in FIG. 6) of the current image 208 captured by the imaging unit S100. In this case, a degree of image similarity M(i) (i=1, 2, ...) between the current image 208 and the searched similar image D202. The Bag of Keypoints (words) and feature matching are known as techniques of similar image searching, but any other technique capable of quantifying the degree of image similarity of the similar image D202 may be used. In the Bag of Keypoints (words) for example, a luminance value is decomposed into several vocabularies based on a group of the reference images 205 entered in the map in advance and when an image search is performed, the degree of image similarity M(i) is obtained by calculating a distance between the frequency of appearance (histogram) of each vocabulary of the current image 208 and the histogram of the search target images D201. By calculating the degree of image similarity in this manner, information to estimate the self-location is increased so that more correct self-localization can be performed.

In a conditional branch S103, if no similar image is searched for by the similar image search unit S102, the processing proceeds to the imaging unit S100 and if a similar image is searched for by the similar image search unit S102, the processing proceeds to the temporary self-localizer S104. Accordingly, as described above, the processing is repeated until a similar image is searched for, more accurate self-localization can be performed.

The temporary self-localizer S104 calculates a self-location presence area based on the distribution of imaging positions of the similar images D202 and the degree of image similarity M(i) of the similar image D202 and causes the storage device 102 to store the self-location present area as a temporary self-location 210.

First, in S400 of FIG. 4, unnecessary similar images (D300 in FIG. 7) whose imaging position deviates are removed from the similar images D202 searched for by the similar image search unit S102 and similar images that are not removed are set as necessary similar images (D301 in FIG. 7) and used for subsequent processing. Data clustering such as the K averaging method, the component analysis method such as the independent component analysis, and the test of hypothesis such as the Smirnov-Grubbs test are known as techniques to extract outlier points and any technique may be used. Data clustering is very fast and superior in real-time properties, but depending on the initial value setting, one set may be divided into a plurality of sets and in such a case, integration processing of clusters is needed. In the case of component analysis, the main component analysis is low-loaded, but correct outlier removal may be impossible due to the constraint condition of orthogonality and in the independent component analysis, there is no constraint condition of orthogonality and more correct outlier removal is possible, but it may take time for a value to converge due to nonlinear minimization. The test of hypothesis is loaded just like the data clustering and has the highest accuracy of outlier removal, but cannot be used when the number of pieces of data is small.

Next, in S401 of FIG. 4, self-location presence likelihood (D400 in FIG. 8) is set to around each of the similar images D301 calculated in the processing S301 by the similar image search unit S102. The self-location presence likelihood D400 is set as a circle of a radius R(i) (D402 in FIG. 8) around (D401 in FIG. 8) the necessary similar image D301. Here, an inverse 1/M(i) of the degree of image similarity M(i) (i=1, 2, 3, ...) is set as the radius R(i).

In S402 of FIG. 4, the self-location presence likelihoods D400 set to around each of the necessary similar images D301 are merged, an error ellipse (D500 in FIG. 9) represented by an average and a variance/covariance matrix of the self-location is calculated and the average (D501 in FIG. 9) is set as the best estimated value ($\mu x$, $\mu y$) of the self-location. The best estimated value is calculated by $\mu x=(\Sigma x\ (i)R(i))/(\Sigma R(i))$, $\mu y=(\Sigma y(i)R(i))/(\Sigma R(i))$ using coordinates $(x(i), y(i))$ of the necessary similar image D301 and the radius R(i). That is, the weighted average of the weight $R(i)/(\Sigma R(i))$ becomes the best estimated value. Thus, the variance/covariance matrix has the variance when the weight $R(i)/(\Sigma R(i))$ is assigned to coordinates $(x(i), y(i))$ of the necessary similar image D301 as diagonal components and the covariance as non-diagonal components. The error ellipse D500 is calculated by first setting a confidence interval $\chi^2$ and setting two eigenvectors of the variance/covariance matrix as axes with the value obtained as a square root of the product of each eigenvalue and the confidence interval $\chi^2$ set as the length of a major axis or a minor axis. The center ($\mu x$, $\mu y$) of the error ellipse is the best estimated value of the temporary self-location 210 and the area represented by the error ellipse becomes the presence area of the temporary self-location 210. By assigning an inverse of the degree of image similarity to imaging positions and calculating an average and a variance/covariance matrix of weighted imaging positions as described above, the presence area of the self-location can be determined. Accordingly, a self-localization device according to the present invention can be incorporated into a self-localization system that takes a stochastic process into consideration and also nonlinear optimization like in a conventional self-localization system is not performed at all and therefore, self-localization can be performed at low processing load.

With the above configuration, a self-localization device according to the present invention and a movable body can improve the accuracy of self-localization in any traveling environment and reduce the processing loads by setting a map reference area around the latest self-location, searching for similar images of the current image in the area from images in the map, and estimating the self-location based on the distribution thereof. Therefore, by incorporating an example of the present invention into a self-localization device that frequently loses the self-location, the device can recover from a state in which the self-location is lost.

That is, a self-localization device described in the present example is a self-localization device for a movable body mounted with a camera and having reference images whose imaging position is known as a map and the self-localization device is characterized in that an imaging unit that captures an image (current image) of a current traveling environment by the camera, a dead reckoning unit that calculates a moving distance from a latest self-location estimated last, a similar image search unit that fetches reference images in an area around the latest self-location whose radius is the moving distance from the map to search the reference images for a similar image of the current image, and a temporary self-localizer that estimates a self-location based on a distribution of the imaging positions of the similar images are included. Accordingly, the accuracy of conventional self-localization can be improved. Also, by incorporating the self-localization device into a self-localization system that easily loses the self-location due to its high precision, even if the self-location is lost, the system can recover from such a state.

The present invention is not limited to the above example and various modifications are included. For example, the above example is described in detail to make the present invention easier to understand and the present invention is not necessarily limited to examples including all described components. Part or all of the above configurations, functions, processing units, and processing means may be realized by hardware, for example, by designing an integrated circuit. The above configurations and functions may also be realized by software in which a program realizing each function is interpreted and executed by a processor. Information such as a program to realize each function, a table, a file and the like can be placed in a recording device such as a memory, a hard disk, and SSD (Solid State Drive) and the like or a recording medium such as an IC card, an SD card, DVD and the like.

What is claimed is:

1. A self-localization device comprising:
a storage unit that associates and stores a plurality of reference images and imaging positions of the plurality of respective reference images; and
an operation unit that periodically estimates a self-location of a movable body based on information obtained from a sensor included in the movable body, wherein
the operation unit
determines, when estimation of the self-location fails, a moving distance from a latest self-location obtained from successful estimation of the self-location before the estimation fails using the information from the sensor and
extracts a plurality of the reference images belonging to a range of the moving distance from the latest self-location and searches the plurality of extracted reference images for images similar to a current image captured by an imaging device included in the movable body to estimate the self-location of the movable body.

2. The self-localization device according to claim 1, wherein
the operation unit searches the plurality of reference images for a plurality of the reference images similar to the current image and estimates the self-location based on a distribution of imaging positions associated with the plurality of searched reference images.

3. The self-localization device according to claim 2, wherein
the operation unit performs self-localization by removing points deviating from a set of the imaging positions of the plurality of searched reference images.

4. The self-localization device according to claim 3, wherein
the operation unit calculates a degree of image similarity between the current image and the reference images when searching for the reference images similar to the current image.

5. The self-localization device according to claim 4, wherein
the operation unit assigns an inverse of the degree of image similarity calculated to the imaging positions of the reference images and estimates the self-location by calculating an average and a variance/covariance matrix of the imaging positions weighted.

6. The self-localization device according to claim 1, wherein
the operation unit performs, when the reference image similar to the current image is not searched for, self-localization using a current image captured again by the imaging unit.

7. A movable body comprising: the self-localization device according to claim 1.

* * * * *